United States Patent [19]

Stoltman et al.

[11] Patent Number: 5,234,024
[45] Date of Patent: Aug. 10, 1993

[54] DIFFERENTIAL PRESSURE REGULATOR

[75] Inventors: Donald D. Stoltman, Henrietta; Kenneth J. Dauer, Avon, both of N.Y.

[73] Assignee: General Motors Corporation, Detroit, Mich.

[21] Appl. No.: 909,488

[22] Filed: Jul. 6, 1992

[51] Int. Cl.$^5$ .................................................. G05D 7/06
[52] U.S. Cl. ........................................ 137/495; 60/286; 251/129.16; 251/129.21; 431/19
[58] Field of Search ......................... 60/286; 137/495; 251/129.16, 129.21; 431/12, 19

[56] References Cited

U.S. PATENT DOCUMENTS

| | | | |
|---|---|---|---|
| 3,994,356 | 11/1976 | Smitley | 137/495 X |
| 4,693,275 | 9/1987 | Stoltman | 137/625.65 |
| 4,955,350 | 9/1990 | Albertson | 123/523 |

Primary Examiner—Gerald A. Michalsky
Attorney, Agent, or Firm—Karl F. Barr

[57] ABSTRACT

A fuel pressure regulator controls the pressure differential across a nozzle which is subject to variations in exhaust gas backpressure having a solenoid actuated valve member which is actuable in response to signals from a controller to establish a predetermined fuel pressure across the nozzle consistent with a control strategy. A pressure dependent valve actuator is operable on the valve member, independently of the solenoid, to adjust the valve opening and, as such, the fuel pressure at the nozzle to adjust the fuel pressure in response to exhaust gas.

8 Claims, 1 Drawing Sheet

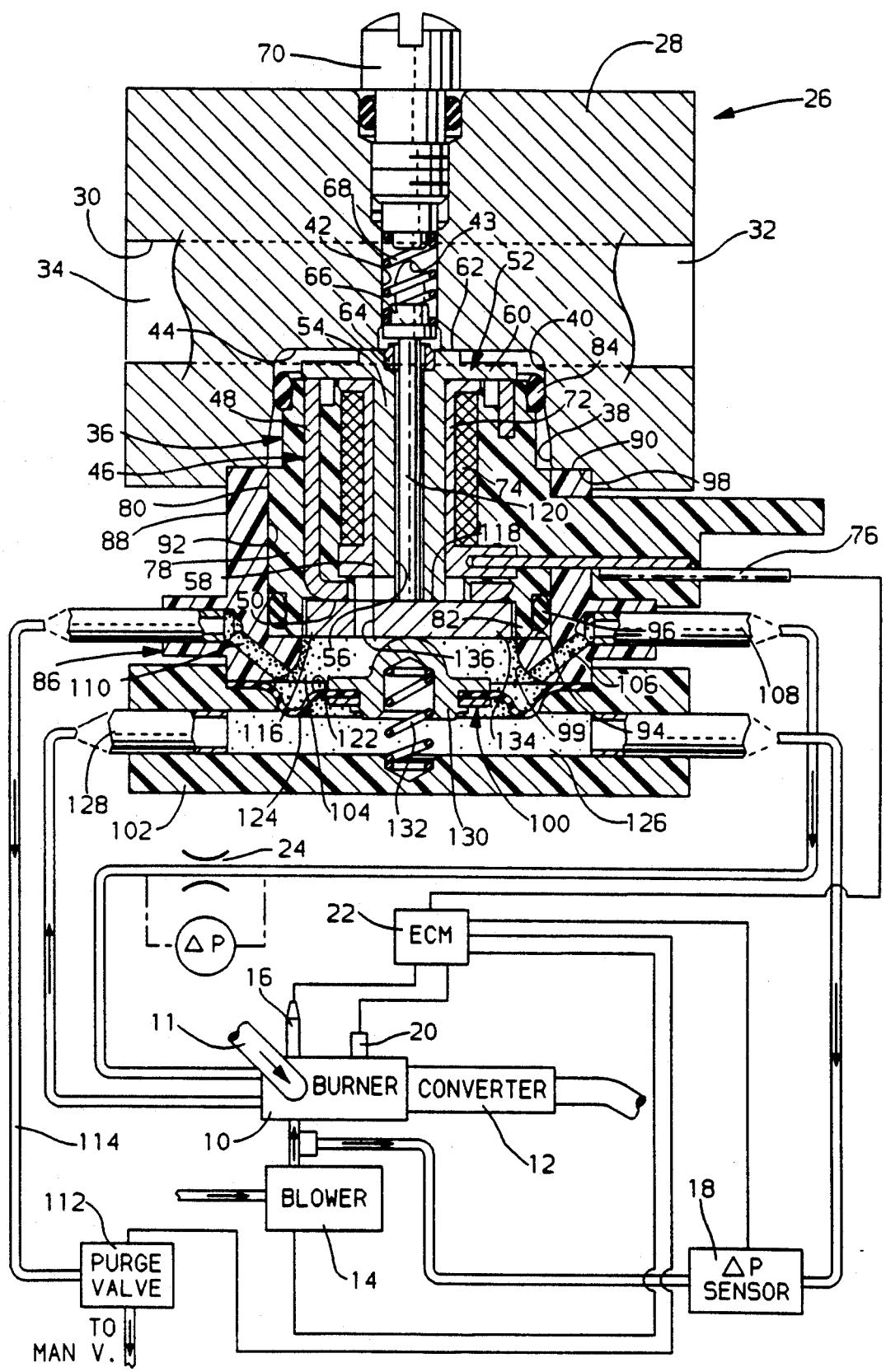

DIFFERENTIAL PRESSURE REGULATOR

BACKGROUND OF THE INVENTION

1. Field of the Invention

This invention relates to the control of fluid to a nozzle and, more particularly, to a fluid pressure regulator having a duty cycle controlled, solenoid valve for controlling fluid to a nozzle which is subject to varying downstream pressure and a pressure dependent feedback means for modifying the fluid pressure to account for variation in downstream pressure.

2. Description of the Relevant Art

Advancement in emission technologies for internal combustion engines has resulted in significantly lowered total engine emissions. In general, automotive emission applications employ an exhaust mounted catalytic treatment device for the reduction of regulated exhaust constituents such as Hydrocarbons (HC), Carbon Monoxide (CO), and Oxides of Nitrogen ($NO_x$) in the engine exhaust prior to its release to the atmosphere. The catalyst treatment devices, or catalytic converters, rely on the latent heat of the exhaust gas to become catalytically active following a cold start. Initiation of catalyst activity occurs at the light-off temperature and is typically in the area of 400 degrees C. A vehicle may require 75–100 seconds or more before the engine exhaust supplies enough heat to reach catalyst light-off. The need to preheat a catalytic converter prior to efficient emission conversion suggests that significant vehicle tailpipe emissions of regulated constituents occur prior to converter light-off. Accordingly, to reduce cold-start emissions, it is desirable to provide an additional heat source to the exhaust stream at engine start-up, thereby promoting faster heating of the converter and a shorter time to optimal catalyst efficiency.

One method of preheating catalytic converters involves the use of fueled burner systems which combust gaseous or liquid fuel in an exhaust mounted burner for a short time following engine start-up. Such systems generally require a combustor mounted in a burner housing having an outlet in communication with engine exhaust gas. The burner requires a fuel supply and means such as a fuel injector or nozzle for introducing the fuel to the combustor. In addition, combustion air must be supplied and mixed with the fuel in a proportion which results in optimum fuel/air mixture for combustion. An ignition source, such as a spark plug, ignites the fuel/air mixture in the combustor.

The burner fuel supply is most conveniently an extension of the engine fuel supply and, consequently, should be configured so as not to compromise the operation of that system, or be affected by it. Substantially instantaneous ignition and reliable operation of the burner is a requirement and, as such, the fuel supply must be able to compensate rapidly to changes in pressure differential across the fuel discharge nozzle caused by exhaust backpressure variation and to changes in fuel supply pressure caused by changes in engine operation. It is desirable to render such backpressure and fuel pressure variations transparent to the burner allowing fueling to occur in a manner consistent with the goals of the burner control strategy.

Accordingly, an object of the present invention is to provide a fuel pressure regulator, for use with an exhaust gas burner, capable of supplying fuel to a fuel nozzle in such a manner as to maintain a desired pressure differential across the nozzle regardless of exhaust backpressure variation on the downstream, or outlet side of the nozzle, and regardless of fuel supply pressure. Response to system changes must occur rapidly to permit fast and reliable ignition and operation of the burner.

Another object of the present invention is to provide a solenoid actuated fuel pressure regulator capable of continuously modulating pressure differential relative to a predetermined input percent duty cycle.

Another object of the present invention is to provide an electric pressure regulator having a minimum internal volume with no fuel recirculation, which can be reverse-purged following burner operation to prevent discharge of unburned fuel to the burner.

SUMMARY OF THE INVENTION

The disclosed pressure regulator comprises a support structure, or housing, through which the fuel supply passes and in which is mounted a solenoid actuator. A spring biased valve resides in the fuel supply passage of the support structure and seats against a valve seat. The valve regulates fuel flow from the supply to the regulator. A solenoid driven actuator acts to unseat the valve, allowing fuel to flow into the pressure regulator and to a fuel nozzle. The solenoid is pulse-width modulated at a variable duty cycle to adjust the fuel pressure to the nozzle in accordance with the burner control strategy. The location of the nozzle within the exhaust gas environment subjects it to variances in exhaust backpressure caused by changes in engine operation. Such backpressure variations, unless compensated for, will affect the fuel pressure differential across the nozzle and, therefore, the control of the burner.

In order to render exhaust pressure variations transparent to burner operation, a fuel pressure control diaphragm assembly, in communication with exhaust backpressure, acts to vary the degree of valve opening dependent upon the magnitude of exhaust backpressure acting on the nozzle. The fuel pressure control diaphragm is operative on the fuel control valve independently of the solenoid, allowing adjustment to the fuel supply as called for by the control algorithm, while rendering backpressure variations transparent to the goals of the burner controller and burner operation. In a similar respect, variations in fuel supply pressure due to changing engine operation will act on the diaphragm to vary the degree of valve opening depending upon pressure changes, resulting in fuel supply pressure variations which are transparent to burner operation.

Other objects and features of the invention will become apparent by reference to the following description and to the drawing.

BRIEF DESCRIPTION OF THE DRAWING

The sole figure of the drawing schematically illustrates an exhaust gas burner system employing the differential pressure regulator of the present invention.

DESCRIPTION OF THE PREFERRED EMBODIMENT

Referring to the Figure, a burner 10 is illustrated for combusting a fuel, supplied from a source, and ejecting the burnt gases from the fuel into an exhaust stream 11, such as that from an internal combustion engine (not shown). The burner 10 is useful for adding heat to the exhaust gas stream for rapidly heating the catalyst in a catalytic converter 12 to which it is shown in operable communication. A blower 14 supplies combustion air to the burner 10 in a proportion required for optimal combustion of the supplied fuel. The fuel and air are mixed within the burner 10 and are ignited by an ignitor 16, such as a spark plug or glow plug. The fuel supply, blower and ignitor are controlled, during operation, by an electronic controller (ECM) 22 which issues commands consistent with the goals of the burner control strategy and based on information gathered from sensors such as deferential pressure sensor 18, and flame detector 20.

To assure reliable operation of the burner 10, it is important to maintain a predetermined pressure differential across the fuel discharge nozzle 24. As such, adjustments must be made, during operation of the burner 10, to the pressure of fuel supplied at the nozzle 24, compensating for variations in exhaust backpressure caused by changes in engine operation. The pressure regulator, designated generally as 26, is useful for this purpose.

In the Figure, a support structure or fuel supply manifold 28 has a fuel passage 30 extending therethrough from an inlet 32 to an outlet 34. The supply passage 30 is connected to a source of high pressure fuel (not shown), which in an automotive application may be the fuel supply for the vehicle internal combustion engine. The support structure 28 defines a housing for an electro-hydraulic pressure regulating valve 36, which is disposed in a stepped bore 38 and operates to regulate the fuel pressure across the burner fuel nozzle 24. Stepped bore 38 includes a large diameter inner wall 40 and a small diameter inner wall 42 connected to the wall 40 by a shoulder 44 and extending from the shoulder 44 through the structure 28 to form a through-bore which intersects and communicates at opening 43 with fuel passage 30.

A solenoid 46 of the pressure regulating valve 26 is disposed within the large diameter inner wall 40 of stepped bore 38 and includes a cup-shaped outer pole piece 48 having an annular working surface 50. An inner pole piece 52 of the solenoid 46 includes a cylindrical, tubular stem portion 54 having an internal cylindrical bore 56 extending therethrough, and an outer cylindrical wall 58. The inner pole piece 52 further includes a flanged portion 60 having an annular land 62 extending about the upper end of internal cylindrical bore 56. The land 62 bears against the shoulder 44 at a location adjacent to the small diameter inner wall 42 thereby defining an inlet for fuel from the fuel passage 30 to the cylindrical inner bore 56 of the inner pole piece 52. Inner cylindrical bore 56 of the tubular stem portion 54 cooperates with land 62 to receive a valve seat 64. The valve seat may be a hardened insert such as is shown in the Figure, and is configured to cooperate with a valve 66 to regulate the flow of fuel from fuel passage 30 to the internal cylindrical bore 56. The valve 66 is biased towards a normally closed, seated position relative to valve seat 64 by spring 68 disposed within small diameter inner wall 42 of stepped bore 38. The biasing force exerted on valve 66 by spring 68 may be adjusted by rotating adjustment screw 70, located in a threaded portion of small diameter inner wall 42, and engaged with the end of the spring 68 remote from valve 66. The valve 66 has, in the preferred embodiment illustrated, a generally disc shaped configuration. It is, however, contemplated that the valve may have other configurations such as a spherical shape.

An insulating bobbin 72 of the solenoid 46 is received on the outer cylindrical wall 58 of the stem portion 54 and abuts the flanged portion 60 of the inner pole piece 52. A coil 74 of the solenoid 46 is wound in conventional fashion on the bobbin 72, the coil being energizable through a pair of pin terminals 76 extending through an opening in outer pole piece 48.

Solenoid 46 is encapsulated in body 78, which has an outer surface 80 configured to be closely received in the large diameter inner wall 40 of stepped bore 38. An annular spacer member 82, formed integrally with the body 78, extends from the lower surface thereof. The body 78 is preferably constructed of a rigid, fluid tight material having good resistance to degradation in a fuel environment, such as glass filled nylon. A resilient sealing member, such as O-ring 84, defines a fluid seal against fuel leakage from stepped bore 38 in fluid communication with fuel passage 30.

A fuel regulator base member 86 has side walls 88, terminating in upper surface 90 and defining an inner wall 92 comprising a through-bore therein. Inner wall 92 has a shoulder 94 intermediate its length configured to closely receive the lower portion of solenoid body 78 with annular spacer member 82 in abutment with shoulder 94. A resilient seal ring 96 is seated between the inner wall 92 and the outer surface of the annular spacer member 82 to define a fluid seal therebetween. The upper surface 90 of the base member cooperates with corresponding channel 98 in support structure 28 to substantially enclose solenoid 46, as in a housing. Fuel regulator base member has an opened lower portion 99 which is closed by a diaphragm assembly 100, secured in place by exhaust pressure manifold 102. The annular working surface 50 of outer pole piece 48, the opened lower portion 99 of base member 86, and the diaphragm assembly 100 cooperate to define fluid control pressure chamber 104.

A control pressure port 106, formed in the base member 86, connects the chamber 104 with the fuel nozzle 24 through fuel conduit 108. Similarly, purge port 110, formed through the bottom portion of the base member 86, connects the chamber 104 with a purge valve 112 through fuel conduit 114. A magnetically permeable armature 116 is disposed in the fuel control pressure chamber 104. The armature 116 is configured as a substantially disc-shaped member and resides within the space defined by annular spacer member 82 of solenoid body 78. The armature 116 has an upper working surface 118 engaging push rod 120 which is loosely disposed within the cylindrical tubular stem portion 54 of inner pole piece 52. The push rod 120 extends between and contacts both the armature upper working surface 118 and the valve member 66.

Diaphragm assembly 100 has an upper surface 122 in communication with fuel control pressure chamber 104 and a lower surface 124 in communication with exhaust pressure chamber 126 in exhaust pressure manifold 102. The exhaust pressure manifold is connected through exhaust pressure port 128 to receive an exhaust pressure signal from exhaust gas burner 10. A rigid center stop 130 is centrally disposed in diaphragm assembly 100 and is acted upon by a biasing means such as spring 132 which acts to urge the stop member 130 upwardly, as viewed in the Figure, into contact with the lower working surface 134 of armature 116. The effect of the upwardly biased stop member 130 against armature 116 is to bring the stop member 130, armature 116, push rod 120, and valve member 66 into contact with one another, allowing a force, representing a changing exhaust backpressure, to be transmitted directly to the valve member.

During normal operation of the engine as, for example, when burner operation is not required, spring 68, in cooperation with fuel pressure in fuel passage 30 and inner wall 42, acts on valve 66, urging it into a normally closed position relative to valve seat 64 thereby preventing fuel flow to burner nozzle 24. In this mode, valve 66 urges the push rod 120 and armature 116 downwardly, resulting in a maximum air gap between the upper working surface 118 of the armature 116 and the annular working surface 50 of outer pole piece 48. It is not desirable to have fuel present in the control pressure passage 104 or at the nozzle 24 when the burner is not operating due to the high operating temperatures of an exhaust environment which may lead to fuel coking and subsequent nozzle failure. Spring 68 is sized so as to maintain valve 66 closed during periods of non-operation against the bias of diaphragm spring 132.

Commencement of burner operation occurs with the energization of the solenoid coil 74 by control module 22. When the coil 74 is energized, the armature 116 is attracted upwardly, as viewed in the Figure, toward working surface 50 of outer pole piece 48. With the upward movement of the armature 116, the valve member 66 is lifted from its fluid sealing portion against valve seat 64 by push rod 120 to admit fuel into cylindrical bore 56 of solenoid 46. A fluid bypass 136 extends through armature 116 so as to allow unimpeded flow of fuel into control pressure chamber 104 as the armature moves into close proximity with the working surface 50 of pole piece 48. Fuel in the fluid control pressure chamber 104 flows through control pressure port 106 and through fuel conduit 108 to nozzle 24 where it is injected into burner 10. If the coil is energized for a sustained period, control pressure will eventually approach the supply pressure in passage 30. If the coil is alternately energized and de-energized, at selected frequencies corresponding to selected duty cycles of the solenoid which represent a predetermined burner control strategy, then the control pressure will stabilize at an intermediate magnitude between the supply pressure and zero.

The control of the solenoid coil by the controller 22 is based largely on a predetermined control strategy as reflected in the controller algorithm. The controller 22 is generally insensitive to variations in exhaust backpressure and fuel supply pressure, caused by changes in engine operation, which will affect the differential pressure across the fuel nozzle 24 and, as a result, fuel delivery to the burner 10. The diaphragm assembly 100 is operable under the influence of such changes to modify the valve opening to adjust fuel flow thereby rendering such changes transparent to burner control and operation. As the exhaust backpressure increases, the diaphragm assembly 100 increases its upward force against the armature 116 thereby moving valve 66 further off valve seat 64 with a resulting increase in fuel pressure reflecting the changing backpressure downstream of nozzle 24. A decrease in the exhaust backpressure will lessen the effect of the diaphragm assembly 100 on valve lift, thereby lowering fuel pressure to adjust for a lowered backpressure at the fuel nozzle 24. Similarly, as fuel supply pressure increases, the diaphragm assembly 100 is acted on to lower its upward force on armature 116 thereby moving valve 66 towards valve seat 64 and decreasing flow to reflect the higher pressure. A decrease in supply pressure will be reflected in a lessening of downward force on the diaphragm 100 with a resulting increase in valve lift. The diaphragm 100 is able to alter the fuel pressure delivered to fuel nozzle 24 on a real time basis which is independent of the controller strategy. Such adjustment of fuel delivery renders changes in the exhaust backpressure and fuel supply pressure substantially transparent to the operation of the burner 10, and allows fuel delivery consistent with the control strategy. Due to the transparency of the exhaust backpressure and fuel pressure on fuel delivery, combustion air may be delivered to the burner based solely on the exhaust backpressure in the burner as determined by pressure sensor 18.

Termination of burner operation occurs through de-energization of solenoid coil 74 by the controller 22, causing the armature 116 to move in a downward direction, as viewed in the Figure, under the urging of biasing spring 68 and the supply fuel pressure from passage 30 which acts on valve 66. The force exerted by spring 68 and the supply fuel pressure are sufficient to maintain the valve in a closed, fuel-off position. Subsequent to fuel shut-off, the controller 22 opens purge valve 112 to vent control pressure chamber 104 and fuel line 108 to a vacuum source such as manifold vacuum, inducing fuel remaining in the regulator 26 and fuel conduit 108 to purge from the system through conduit 114 and purge port 110. This reverse purge configuration is desirable to prevent fuel delivery to the burner 10 following termination of operation when excess fuel within the burner is undesirable. In addition, the removal of fuel exposes control pressure chamber 104 to exhaust backpressure through fuel line 108 and nozzle 24, eliminating a pressure differential across diaphragm 100. As a result, during periods of burner inactivity, diaphragm 100 will not exert an opening force of valve 66 thereby reducing the required spring rate of spring 68 and opening force which must be exerted by solenoid 46 to open valve 66.

The present invention discloses a solenoid controlled pneumatic-hydraulic differential pressure regulator for precise control of fluid to a nozzle situated in an environment of varying pressure. The solenoid, responding to electrical signals from a controller, regulates the fluid through a valve in a manner consistent with a predetermined control strategy. A pressure dependent control means, comprising a diaphragm assembly operably connected to the valve, adjusts fuel flow through the valve in response to changes in pressure across the nozzle and to changes in fuel supply pressure. Adjustment of flow by the pressure dependent control means occurs independently of, and transparent to, the control strategy of the electronic controller.

In addition, the disclosed pressure regulator includes a means for purging fluid from the regulator, nozzle, and associated conduits, following cessation of solenoid operation, in a manner which does not include ejection from the nozzle.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The embodiments of the invention in which an exclusive property or privilege is claimed are defined as follows:

1. A fluid pressure regulator for controlling the pressure differential across a nozzle subject to varying downstream pressure, comprising a valve housing having a fluid control pressure chamber defined therein and operatively connected to a fluid nozzle through a port, a valve through which pressurized fluid is delivered from a source of fluid at a supply pressure to said control pressure chamber, an armature in operable connection with said valve to move said valve between an opened position wherein fluid is admitted from said source to said fluid control pressure chamber and said nozzle, and a closed position wherein fluid is not admitted to said fluid control pressure chamber and said nozzle, an electric solenoid means operative, when selectively energized, to move said armature and said valve from a valve closed to a valve opened position, and pressure dependent valve control means operative on said valve, independently of said electric solenoid means, to adjust the opening of said valve in response to varying downstream pressure on said nozzle, regulating fluid pressure to a desired differential pressure across said nozzle.

2. A fluid pressure regulator for controlling fluid pressure across a nozzle subject to varying downstream pressure, comprising a valve housing having a fluid control pressure chamber defined therein and operatively connected to a fluid nozzle through a port, a valve through which pressurized fluid from a source of fluid at a supply pressure is delivered to said control pressure chamber and said nozzle, a biasing means, operable with said supply pressure from said fluid source to urge said valve to a closed position, an electrically actuable solenoid means having an armature in operable connection with said valve for moving said valve against said biasing means and said fluid supply pressure to an opened position wherein fluid is admitted to said fluid control pressure chamber, and pressure dependent control means, comprising a diaphragm, in communication with said varying downstream pressure and operative on said valve, independently of said electric solenoid means, to adjust the opening of said valve in response to said varying downstream pressure on said nozzle to regulate fluid pressure across said nozzle to a desired pressure differential.

3. A fluid pressure regulator for controlling fluid pressure across a nozzle subject to varying downstream pressure, comprising a valve housing having a fluid control pressure chamber defined therein and operatively connected to a fluid nozzle through a port, a valve through which pressurized fluid is delivered from a source of fluid at a supply pressure to said control pressure chamber, an armature in operable connection with said valve to move said valve between an opened position wherein fluid is admitted from said source to said fluid control pressure chamber and said nozzle and a closed position wherein fluid is not admitted to said fluid control pressure chamber and said nozzle, an electric solenoid means operative, when selectively energized, to move said armature and said valve from a valve closed to a valve opened position, pressure dependent valve control means operative on said valve, independently of said electric solenoid means, to adjust the opening of said valve in response to varying downstream pressure on said nozzle, regulating fluid pressure to a desired differential pressure across said nozzle and, fluid purge means for communicating said fluid pressure control chamber and said nozzle with a vacuum source to remove fluid therefrom.

4. A fluid pressure regulator for controlling the pressure differential across a nozzle, comprising a valve housing having a fluid control pressure chamber defined therein and operatively connected to a fluid nozzle, a valve through which pressurized fluid is delivered from a source of fluid at a varying supply pressure to said control pressure chamber, an armature in operable connection with said valve to move said valve between an opened position wherein fluid is admitted from said source to said fluid control pressure chamber and said nozzle, and a closed position wherein fluid is not admitted to said fluid control pressure chamber and said nozzle, an electric solenoid means operative, when selectivley energized, to more said armature and said valve from a valve closed to a valve opened position, and pressure dependent valve control means operative on said valve, independently of said electric solenoid means, to reduce the opening of said valve in response to an increase in fluid supply pressure and to allow increased opening of sad valve in response to a decrease in fluid supply pressure to thereby regulate fluid pressure to a desired differential pressure across said nozzle.

5. A fluid pressure regulator, as defined in claim 4, said pressure dependent valve control means comprising a diaphragm, in communication with said varying fluid supply pressure and operative on said valve.

6. A fluid pressure regulator for controlling the pressure differential across a nozzle subject to varying downstream pressure, comprising a valve housing having a fluid control pressure chamber defined therein and operatively connected to a fluid nozzle, a valve through which pressurized fluid is delivered from a source of fluid at a varying supply pressure to said control pressure chamber, an armature in operable connection with said valve to move said valve between an opened position wherein fluid is admitted from said source to said fluid control pressure chamber and said nozzle, and a closed position wherein fluid is not admitted to said fluid control pressure chamber and said nozzle, an electric solenoid means operative, when selectively energized, to move said armature and said valve from a valve closed to a valve opened position, and pressure dependent valve control means operative on said valve, independently of said electric solenoid means, to adjust the opening of said valve in response to varying downstream pressure on said nozzle and in response to varying fluid supply pressure upstream of said nozzle, regulating fluid pressure to a desired differential pressure across said nozzle.

7. A fluid pressure regulator, as defined in claim 6, said pressure dependent valve control means comprising a diaphragm, in communication with said varying fluid supply pressure on a first side and said varying downstream pressure on a second side, said fluid supply pressure and said downstream pressure operative to move said diaphragm and said valve.

8. A fluid pressure regulator, as defined in claim 7, said first side of said diaphragm subject to a hydraulic pressure signal and said second side of said diaphragm subject to a pneumatic pressure signal.

* * * * *